United States Patent Office.

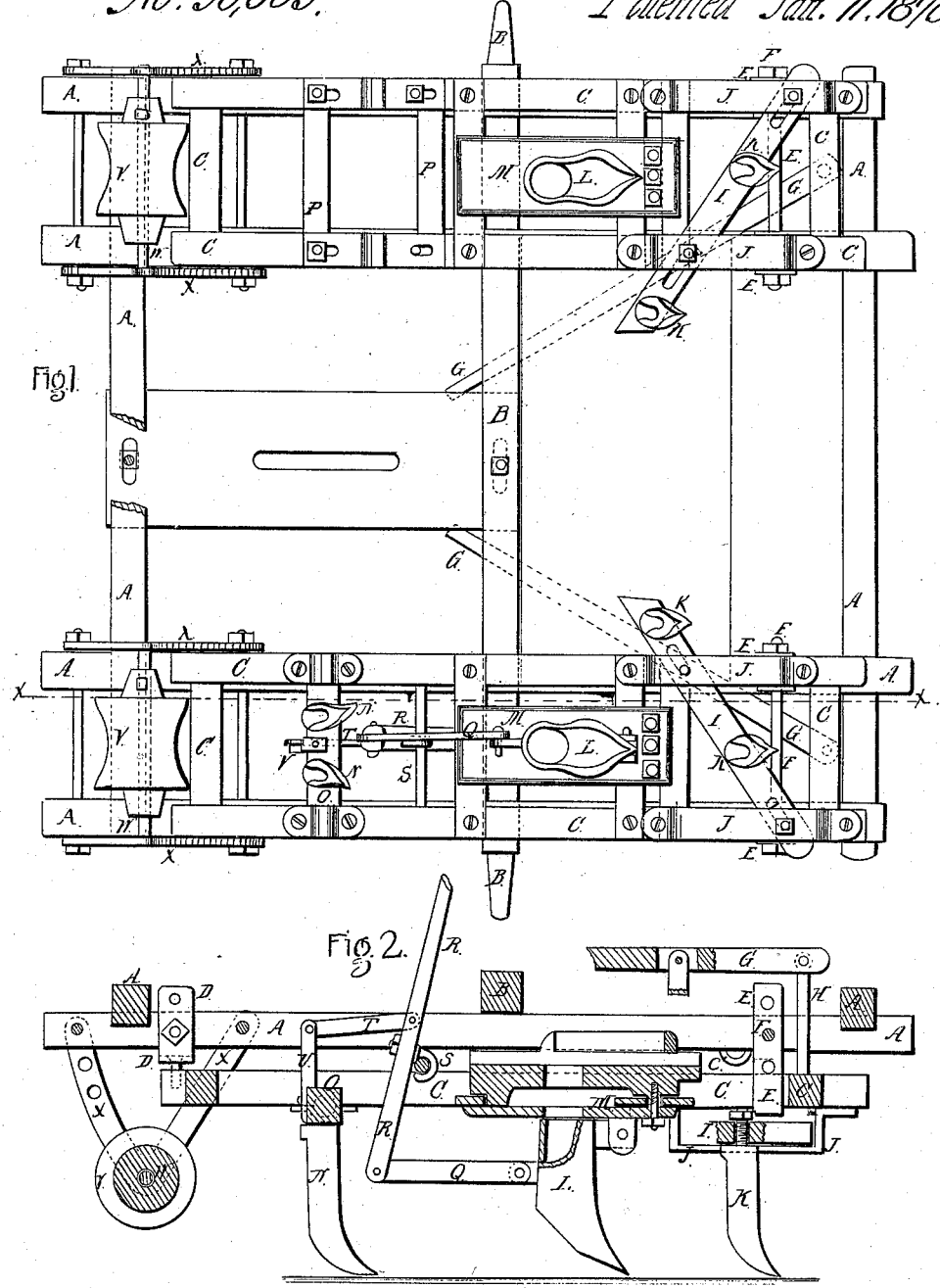

NATHAN BREED, OF JEFFERSONVILLE, INDIANA.

Letters Patent No. 98,663, dated January 11, 1870.

IMPROVEMENT IN CORN-PLANTER AND CORN-CULTIVATOR.

The Schedule referred to in these Letters Patent and making part of the same.

To all whom it may concern:

Be it known that I, NATHAN BREED, of Jeffersonville, in the county of Clark, and State of Indiana, have invented a new and improved Corn-Planter and Cultivator; and I do hereby declare that the following is a full, clear, and exact description thereof, which will enable others skilled in the art to make and use the same, reference being had to the accompanying drawing, forming part of this specification, in which—

Figure 1 is an under-side view of my improved machine.

Figure 2 is a vertical longitudinal section of the same, taken through the line $x$–$x$, fig. 1.

Similar letters of reference indicate corresponding parts.

My invention has for its object to improve the construction of my improved corn-planter, patented April 6, 1869, and numbered 88,604, so as to make it more convenient, satisfactory, and effective in use; and It consists in the construction and combination of various parts, as hereinafter more fully described.

A is the main frame of the machine, which is rigidly attached to the axle B, and with which the other parts of the machine are connected.

C are frames, made a little shorter than the main frame A, and each consisting of two longitudinal bars connected to each other by short cross-bars.

The rear ends of the frames C are hinged to the frame A by bolts passing through the longitudinal bars of the frame A, and through one or the other of the holes in the arms of the stirrups D, the bows of which are secured to the longitudinal bars of the frames C.

The frames C may be hinged to the frame A by other means, but I prefer the manner above described, as allowing the frames A and C to be conveniently adjusted to work at any desired distance apart.

To the forward ends of the longitudinal bars of the frames C are attached stirrups E, the arms of which extend up upon each side of the longitudinal bars of the frame A, and have holes formed in them to receive a bolt, F. The bolts F may be passed through the holes in the arms of the stirrups E, above the longitudinal bars of the frame A, or through said bars, according as it is desired to have the forward ends of the frames C loosely or rigidly connected with the frame A.

G are levers pivoted to supports attached to the frame A, and the forward ends of which are connected with the forward ends of the frames C by the connecting-rods H. The rear ends of the levers G extend back into such a position that they can be conveniently reached and operated by the driver from his seat.

I are inclined bars placed beneath the forward parts of the longitudinal bars of the frames C, and supported by keepers, bars, or down-hangers J, to which the said bars I are adjustably secured by bolts passing through holes in the said keepers or bars J, and through slots in the bars I, so that the said bars I may have a longitudinal adjustment.

The middle parts of the keepers J should project down so much that the bars I will not interfere with the oscillating shaft working in the bearings C, and which is not shown in the drawing.

To the bars I are secured the cultivator-plows K, as shown in figs. 1 and 2.

This construction enables the plows K to be adjusted laterally, according to the distance apart of the rows, or so that the ground may be cultivated at the same time that the planting is being done.

L are the furrowing-plows, through the standards of which the seed is conducted to the ground, and which are hinged to the adjustable bed M.

N are the covering-plows, the standards of which are attached to the shafts O, which work in bearings attached to the frames C, or in the adjustable frames P, which are secured to the said frames C.

To the rear part of the plow L is pivoted the forward end of the connecting-bar Q, the rear end of which is pivoted to the lower end of the lever R, which is pivoted to and slides laterally upon the rod S, the ends of which are attached to the frame C.

To the lever R is also pivoted the forward end of the connecting-bar T, the rear end of which is pivoted to an arm, U, attached to the shaft O.

The upper ends of the levers R extend up into such a position that they can be conveniently reached and operated by the driver from his seat, to raise the plows L and N from the ground, or to lower them again into working position when required.

V are the grooved or concaved covering-rollers, which are placed upon the shaft W, to which they are adjustably secured by set-screws, so that they may be adjusted to follow the row being planted, and complete the covering of the seed, or may be adjusted to the sides of said rows, as may be desired.

The ends of the shafts W work in bearings in the brackets X, the upper ends of the forward arms of which are pivoted to the frame A by bolts and nuts, and the upper ends of the rear arms of which are adjustably secured to the said frame A by bolts passing through the longitudinal bars of the said frame, and through one or the other of the holes through the said arms of the said brackets.

This enables the rollers V to be raised or lowered, as it is desired to have the plows work deeper or shallower in the ground.

Having thus described my invention,

What I claim as new, and desire to secure by Letters Patent, is—

1. The frames C, adjustably connected to the frame

A, at their rear and forward ends respectively, by the stirrups D and E, and their fastening-bolts, and adapted to be adjusted at their forward ends by the pivoted lever G and connecting-rod K, as herein shown and described, for the purpose specified.

2. The arrangement of the seed-plow L, levers Q, R, T, and U, and covering-plow N, with relation to each other and the frame C, substantially as herein shown and described, for the purpose specified.

3. Connecting the forward cultivator-plows K to the frames C, by means of the slotted bars I and downwardly-projecting bars or keepers J, substantially as herein shown and described, and for the purpose set forth.

NATHAN BREED.

Witnesses:
   GEORGE A. McCORD,
   CHARLES H. HALL.